United States Patent [19]

Fink et al.

[11] Patent Number: 4,692,101

[45] Date of Patent: Sep. 8, 1987

[54] LIQUID RING VACUUM PUMP ARRANGEMENT HAVING MINIMIZED OPERATING LIQUID CONSUMPTION

[75] Inventors: Werner Fink, Bardowick; Heinz Bohn, Rullstorf, both of Fed. Rep. of Germany

[73] Assignee: ITT Industries, Inc., New York, N.Y.

[21] Appl. No.: 754,419

[22] Filed: Jul. 11, 1985

[30] Foreign Application Priority Data

Jul. 12, 1984 [DE]  Fed. Rep. of Germany ....... 3425616

[51] Int. Cl.$^4$ .................... F04C 19/00; B01D 19/00
[52] U.S. Cl. ........................................ 417/68; 55/204
[58] Field of Search ................... 417/68, 69, 228; 55/204, 191, 177

[56] References Cited

U.S. PATENT DOCUMENTS

| | | | |
|---|---|---|---|
| 2,057,257 | 10/1936 | Walker | 55/177 X |
| 2,178,994 | 11/1939 | Inglis | 417/69 |
| 2,230,405 | 2/1941 | Jennings | 417/68 X |
| 2,971,691 | 2/1961 | Lorenz | 417/69 |
| 3,032,258 | 5/1962 | Jennings | 417/68 |
| 3,088,595 | 5/1963 | Robb | 55/204 X |
| 3,877,904 | 4/1975 | Lowrie | 55/204 X |
| 4,050,851 | 9/1977 | Haavik | 417/68 |
| 4,083,658 | 4/1978 | Ramm | 417/68 |
| 4,087,208 | 5/1978 | Uda et al. | 417/68 X |
| 4,151,725 | 5/1979 | Kountz et al. | 417/32 X |
| 4,260,335 | 4/1981 | Marchal | 417/68 |

FOREIGN PATENT DOCUMENTS

| | | | |
|---|---|---|---|
| 611354 | 12/1960 | Canada | 417/228 |
| 2558401 | 7/1976 | Fed. Rep. of Germany | 417/68 |
| 2511334 | 9/1976 | Fed. Rep. of Germany | 417/68 |
| 3207507 | 9/1983 | Fed. Rep. of Germany | 417/68 |

Primary Examiner—Carlton R. Croyle
Assistant Examiner—Paul F. Neils
Attorney, Agent, or Firm—Menotti J. Lombardi

[57] ABSTRACT

To minimize water consumption and to provide enhanced suction ability in a liquid ring vacuum pump the temperature of the exhaust liquid is measured and the amount of operating liquid supplied to the pump is varied.

9 Claims, 7 Drawing Figures

LIQUID RING VACUUM PUMP ARRANGEMENT HAVING MINIMIZED OPERATING LIQUID CONSUMPTION

BACKGROUND OF THE INVENTION

The invention pertains to a liquid ring vacuum pump, in general, and to an arrangement to minimize the cooling liquid consumption as well as to prevent cavitation in a liquid ring vacuum pump, in particular.

The suction capability of a liquid ring vacuum pump depends on the operating liquid. Where water is used as the operating liquid the suction capability of the water ring-vacuum-pump can be considerably influenced by adjusting the temperature of the operating liquid. In particular, for higher vacuums a lower operating liquid temperature results in better operation. Therefore, cooling the circulating operating liquid is necessary. Normally when water is used as operating liquid cooling is achieved by removing a part of the heated liquid from the operating liquid circuit and by replacing that amount with cool, fresh liquid from a supply line. Therefore the operation of a water ring-vacuum pump usually requires considerable fresh water consumption, which affects the operating costs of such a pump.

SUMMARY OF THE INVENTION

It is one object of the invention to reduce the consumption of operating liquid. It is another object of the invention to reduce the water operating costs particularly for water ring-vacuum-pumps.

In accordance with the principles of the invention a one- or multistage gas-liquid separator with a temperature sensor is placed in the tank or in the circulation pipe of the exhaust pipe or of the vacuum pump for the operating liquid temperature of the liquid ring vacuum pump. The temperature sensor is connected to a control device which in turn controls a regulating valve in the cooling liquid pipe.

Advantageously, the temperature sensor should be connected to a controlling device which has one or more inputs and outputs as well as chronological and logical functions for a programmable logic control. The controlling device is in turn connected to and controls the adjusting valve in the cooling liquid pipe.

In a preferred embodiment of the invention the gas-liquid separator is a two-stage-circulation separator, with the first stage being a cyclone separator and the second stage being a potential vortex separator. The cyclone separator is constructed as a casing with a cylindrical jacket having a tangential input for the gas-fluid mixture and having an output for excess liquid to drain. The casing has a closed top covering part and a bottom part. The bottom includes an outlet channel for the operating liquid and a pipe for exhausting the gas from the separator. The exhaust gas pipe extends into the separator and has its open end located above the drain output of the derived fluid. The potential vortex separator is constructed as a cylindrical casing which has been placed in the cylindrical casing of the cyclone separator. The open bottom of the potential vortex separator is located in the separating chamber for the liquid below the drain output for the excess fluid. The potential vortex separator is open at its upper end. Sheet metal guides are connected to the interior of the potential vortex separator casing and lead the flow from the interior of the cyclone separator tangentially into the interior of the cylindric casing.

The temperature sensor can be constructed as a submersible temperature sensor projecting into the liquid range of the separator arranged at the bottom of the gas-fluid separator.

The outlet channel for the operating liquid should be arranged below the cooling liquid input to prevent backflow. The cooling liquid pipe can lead into the suction chamber or into the suction pipe of the vacuum pump. It can end in the gas-liquid separator or in the exhaust pipe.

Further in accordance with the invention a pipe with adjustable gas flow (e.g. with a throttle valve) can lead from the gas chamber of the gas-liquid separator into the operating liquid pipe to prevent cavitation in the vacuum pump.

In this case a vacuum occurs in the operating liquid pipe as a result of the throttling process, through which a variable amount of gas is led over a by-pass from the separator into the vacuum pump.

BRIEF DESCRIPTION OF THE DRAWING

The invention will be better understood from a reading of the following detailed description in conjunction with the drawing in which.

DETAILED DESCRIPTION

Figure 1:
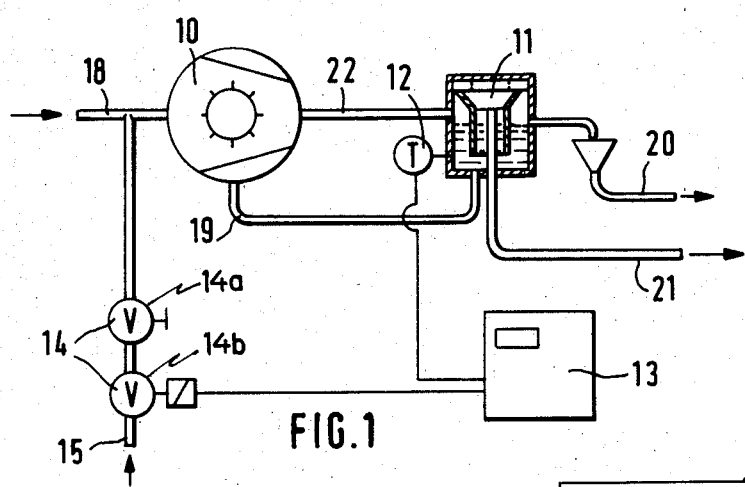
FIG. 1 is a schematic of an arrangement in accordance with the invention.

In the arrangement of FIG. 1, a vacuum pump 10 is coupled via line 18 to a chamber (not shown) which is to be evacuated. It should be noted that although a single pump 10 is shown, in fact, pump 10 may represent several pumps connected in parallel. The gas-operating liquid mixture is exhausted by pump 10 through pipe 22 into a gas-liquid separator 11. A part of the separated liquid is led back into the vacuum pump over the operating liquid pipe 19. The gas which has been separated from the liquid will be removed by exhaust pipe 21.

The gas-liquid separator 11 has a temperature sensor 12, which is connected to a control device 13. Control device 13 is coupled to and controls adjusting valve 14. Adjusting valve 14 includes a preadjustment which determines, for example, a maximum flow rate. As shown, valve 14 includes two functional valve portions i.e. adjustable valve 14a which provides the present function and valve 14b which is electromagnetically operable. Adjusting valve 14 is connected to a fresh- or cooling-water pipe 15.

The control device 13 controls valve 14 such that by adding cooling liquid the temperature of the operating liquid is maintained at a constant value or at an optimum value for each operating point of the pump. For a pressure control operation of the vacuum system the controlling device 13 selects the optimum temperature of the operating liquid and only adds the minimum of cooling liquid needed to maintain the optimum temperature. The controlling tasks will be carried out by a controller or microcomputer in the control device 13.

Figure 1A:
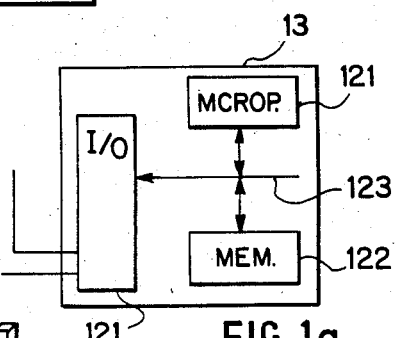
FIG. 1a illustrates details of the control device 13 of FIG. 1.

As shown in FIG. 1a the control device 13 may be formed by a standard microprocessor-memory-I/O interface configuration as is well known in the electronic arts. The microprocessor may be a Texas Instruments TMS 9995. The microprocessor 121 communicates with the I/O interface 124 and memory 122 via its I/O bus 123. The memory may include a read only memory portion containing the programs for the microprocessor and a random access memory portion for storing data. The memory 122 stores various chronological and logic functions in the well known manner for control of the valve 14.

In the separator 11 the same quantity of liquid which has been added as fresh liquid will be drained off through pipe 20. This quantity is a measurement of the real liquid consumption.

Figure 2:
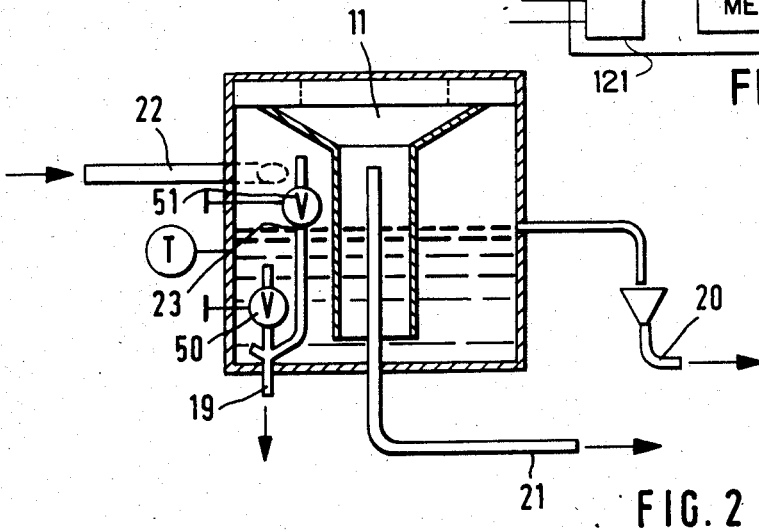
FIG. 2 schematically illustrates an arrangement to lead gas into the operating liquid pipe.

The combination of sensor 12, control box 13 and adjusting valve 14 is replaced in FIG. 2 by the combination of thermostat control 17 and adjusting valve 50, in a simplified version of the control arrangement.

Additionally, in FIG. 2 an arrangement to prevent cavitation in the vacuum pump is shown. A ventilation (pressurizing) line 23 with controllable input from the gas chamber of the separator 11 leads into the operating liquid pipe 19. Since pipe 19 leads to the pump, the air from the gas chamber of separator 11 is drawn into the pump, i.e., air is mixed with the liquid supplied to pump. The input to line 23 is controlled by valve 51 which is manually operable.

Figure 3:
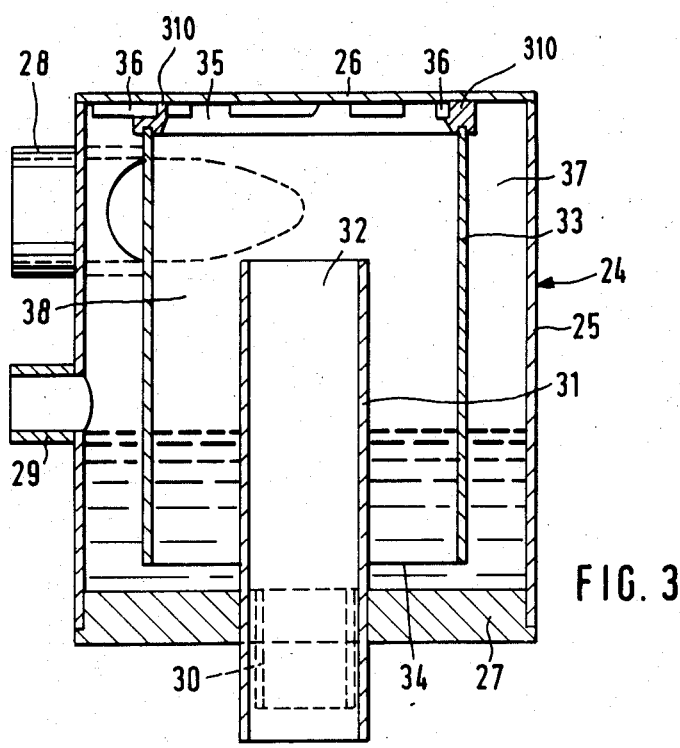
FIG. 3 is a vertical sectional view of a two-stage circulation separator.
Figure 4:
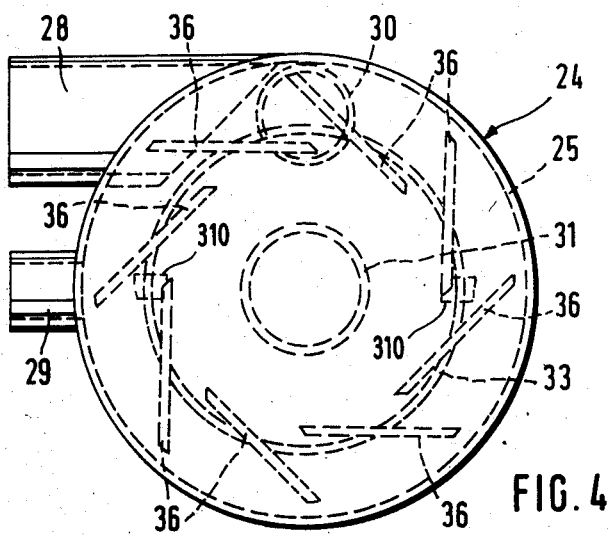
FIG. 4 is a top view of the separator of FIG. 3
Figure 5:
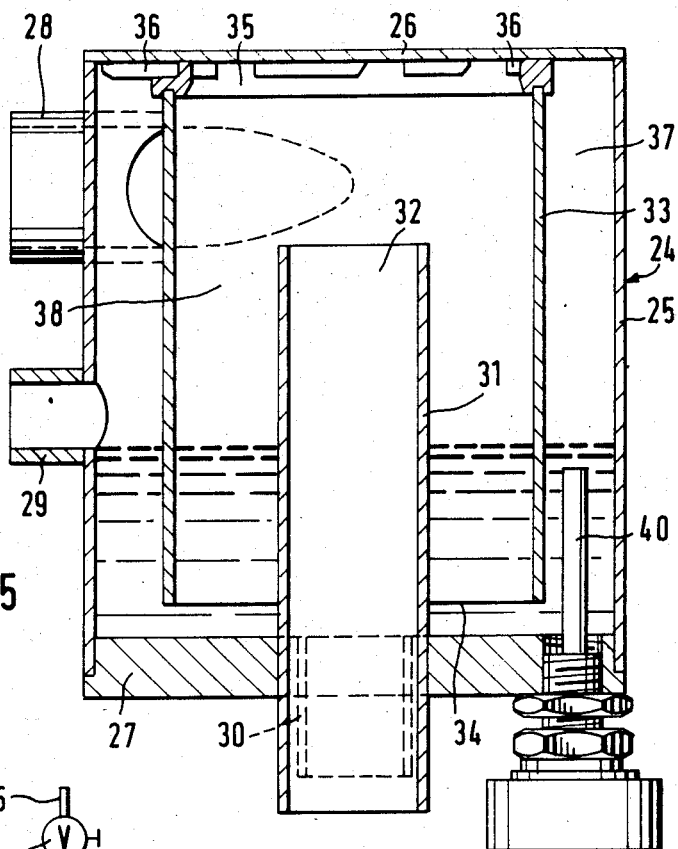
FIG. 5 is the arrangement of FIG. 3 showing a temperature sensor.

The gas-liquid separator is shown enlarged in FIGS. 3, 4 and 5. It includes a cyclone casing 24. Cylindrical inside casing 33 is inserted in casing 24. A potential vortex is caused in inside casing 33. Therefore, a two-stage-centrifugal separator is produced, in which the first stage works according the principle of the cyclone separator and the second stage works as a potential vortex separator.

The cyclone separator has a cylindrical jacket 25 with a cover 26 and a base 27. On the jacket 25 a tangential pipe 28 for the gas- liquid-mixture coming from the vacuum pump is mounted. An output 29 is mounted on jacket 25 through which the quantity of heated operating liquid corresponding to the added fresh liquid is derived. When water is used as the operating liquid, the discharge pipe can eventually lead into the sewer system. For other liquids or alternatively for water the discharge pipe can lead into the cooling and enrichment system for reuse.

At the bottom 27 an outlet or drain 30 is provided for the operating water which has to be transported back to the pump as well as a pipe 31 whose inlet opening 32 is located in the gas chamber of the separator to exhaust the gas.

The potential vortex separator is formed by the cylindrical inside casing 33. There, the gas-liquid-mixture which has been cleared from the liquid in the cyclone separator travels from the annulus 37 of the cyclone separator over the guides of sheet metal 36 which are located at the upper part of the separator below the cover 26 through the upper opening 35 of the inside casing 33 into the interior 38 of the casing 33. Opening 35 is annular with supports 310 for casing 33 spaced around it.

A potential vortex is caused by means of the guides of sheet metal 36 in this interior 38 of the casing, which results in another separation of the gas from the liquid.

The liquid runs down the inside wall of casing 33 and merges with the collected liquid from the cyclone separator since the cylindric inside casing 33 has a bottom opening 34.

As shown in FIG. 5, the temperature sensor maybe built as submersible temperature sensor 40 and can be mounted at the bottom 27 of the gas-liquid separator. An extra compact version can be built, if the cooling liquid pipe 15 and the controlling valve 14, built as magnetic valve with preselection, are placed directly at the separator.

Figure 6:
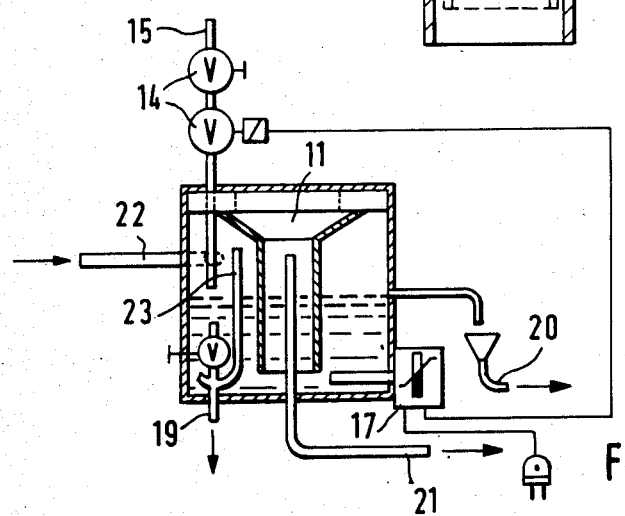
FIG. 6 schematically illustrates the arrangement of the cooling liquid pipe and the adjusting valve at the separator.

In FIG. 6, such an arrangement is shown in schematic form. The arrangement of FIG. 6 also shows a ventilation pipe 23 and operating liquid pipe 19 with controlling units at or in the gas-liquid separator 11.

What is claimed is:

1. An arrangement to minimize the consumption of cooling liquid in liquid ring vacuum pumps, said arrangement comprising:
   a liquid ring vacuum pump;
   a gas-liquid separator including a gas chamber portion;
   an exhaust pipe leading from said pump to said separator;
   an operating liquid pipe leading from said separator to said pump;
   a cooling liquid pipe coupled to said pump to supply cooling liquid thereto;
   a first pipe connecting said gas chamber with said operating liquid pipe and having means for adjusting gas flow to prevent cavitation;
   a temperature sensor for measuring the temperature of cooling liquid exhausted from said pump; and
   means for adjusting the amount of cooling liquid supplied to said pump in response to the temperature measured by said temperature sensor.

2. An arrangement in accordance with claim 1 wherein said adjusting means comprises a throttle valve connected in said first pipe.

3. An arrangement in accordance with claim 2 wherein said throttling valve is mounted in said separator.

4. An arrangement in accordance with claim 1 wherein said adjusting means comprises a valve for throttling gas flow in said operating liquid pipe and by-pass means for coupling a variable amount of gas from said separator to said vacuum pump.

5. An arrangement in accordance with claim 4 wherein said throttling valve is mounted in said separator.

6. An arrangement in accordance with claim 4 comprising means for supplying a variable amount of gas to said operating liquid pipe to prevent cavitation in said pump.

7. An arrangement in accordance with claim 6 wherein said variable amount of gas is supplied from said separator.

8. An arrangement to minimize the consumption of cooling liquid in liquid ring vacuum pumps, said arrangement comprising:
   a liquid ring vacuum pump;
   a two stage gas-liquid separator including a cyclone separator first stage and a potential vortex separator second stage;

an exhaust pipe leading from said pump to said separator;

a cooling liquid pipe coupled to said pump to supply cooling liquid thereto;

a temperature sensor for measuring the temperature of cooling liquid exhausted from said pump; and means for adjusting the amount of cooling liquid supplied to said pump in response to the temperature measured by said temperature sensor;

said cyclone separator comprising a cylindrical jacket, a cover part and a bottom part, a tangential pipe inlet on said jacket coupled to said exhaust pipe, a by-pass outlet on said cylindrical jacket for operating liquid, a separator exhaust pipe on said bottom part for exhausting operating liquid, a gas exhaust pipe extending through said bottom part for drawing off of gas, said pipe having its inlet located above said by-pass outlet; and said potential vortex separator comprising a cylindrical case positioned coaxially within said cylindrical separator, said case having a bottom opening positioned below said by pass outlet and an upper opening connected with the interior of said cyclone separator by a plurality of sheet metal guides which extend essentially tangentially from the interior of said cyclone separator into the interior of said vortex separator.

9. An arrangement in accordance with claim 8 wherein:

said temperature sensor comprises a submersible temperature sensor projecting into the bottom of said gas-liquid separator.

* * * * *